US012210688B2

(12) United States Patent
Yao

(10) Patent No.: US 12,210,688 B2
(45) Date of Patent: Jan. 28, 2025

(54) KEYBOARD MEMBRANE AND KEYBOARD

(71) Applicant: CHANCE LINE INDUSTRIAL CO., LTD., Siansi Township (TW)

(72) Inventor: Ming-Hsien Yao, Siansi Township (TW)

(73) Assignee: CHANCE LINE INDUSTRIAL CO., LTD., Siansi Township (TW)

( * ) Notice: Subject to any disclaimer, the term of this patent is extended or adjusted under 35 U.S.C. 154(b) by 0 days.

(21) Appl. No.: 18/329,301

(22) Filed: Jun. 5, 2023

(65) Prior Publication Data

US 2023/0400931 A1 Dec. 14, 2023

(30) Foreign Application Priority Data

Jun. 8, 2022 (TW) .................................. 111121274

(51) Int. Cl.
*G06F 3/02* (2006.01)
*B29C 51/00* (2006.01)
(Continued)

(52) U.S. Cl.
CPC .......... *G06F 3/0202* (2013.01); *B29C 51/002* (2013.01); *F21V 11/08* (2013.01); *G05G 1/01* (2013.01); *G05G 1/02* (2013.01); *H01H 13/704* (2013.01); *B29C 33/68* (2013.01); *B29K 2069/00* (2013.01); *B29K 2075/00* (2013.01); *B29K 2995/002* (2013.01); *B29K 2995/0025* (2013.01); *B29K 2995/0026* (2013.01); *B29K 2995/0029* (2013.01); *B29K 2995/007* (2013.01); *B29K 2995/0087* (2013.01);
(Continued)

(58) Field of Classification Search
CPC ..... G06F 3/0202; B29C 51/002; B29C 33/68; F21V 11/08; G05G 1/01; G05G 1/02; H01H 13/704; B29K 2069/00; B29K 2075/00; B29K 2995/002; B29K 2995/0025; B29K 2995/0026; B29K 2995/0029; B29K 2995/007; B29K 2995/0087; B29K 2995/0097; B29L 2031/7676
See application file for complete search history.

(56) References Cited

U.S. PATENT DOCUMENTS

2003/0002909 A1   1/2003  Jeffries et al.
2013/0043115 A1*  2/2013  Yang ..................... G06F 1/1662
                                                        200/5 A
(Continued)

FOREIGN PATENT DOCUMENTS

TW          200937472 A     9/2009

*Primary Examiner* — Amit Chatly
(74) *Attorney, Agent, or Firm* — Guice Patents PLLC

(57) ABSTRACT

A keyboard membrane, which is a thin sheet molded object thermoformed by a thermoplastic wear-resistant molding membrane, comprising a plurality of concave-convex parts, the concave-convex part comprises a plurality of upwardly protruding pressing parts, each of the pressing parts has a top wall and a peripheral wall extending downward from a periphery of the top wall; the keyboard membrane is disposed on a key module with keys; each of the pressing parts is connected with one of the keys of the key module; a periphery of the keyboard membrane has a peripheral edge extending outward from the pressing part, and the peripheral edge wraps the key module to form a waterproof and dustproof keyboard.

19 Claims, 9 Drawing Sheets

(51) Int. Cl.
*F21V 11/08* (2006.01)
*G05G 1/01* (2008.04)
*G05G 1/02* (2006.01)
*H01H 13/704* (2006.01)
*B29C 33/68* (2006.01)
*B29K 69/00* (2006.01)
*B29K 75/00* (2006.01)
*B29L 31/00* (2006.01)

(52) U.S. Cl.
CPC ............... *B29K 2995/0097* (2013.01); *B29L 2031/7676* (2013.01)

(56) References Cited

U.S. PATENT DOCUMENTS

| | | | |
|---|---|---|---|
| 2015/0270076 A1* | 9/2015 | Katsuhara | G06F 3/02 |
| | | | 428/141 |
| 2017/0271102 A1* | 9/2017 | Han | H01H 13/705 |
| 2019/0371543 A1 | 12/2019 | Chiang et al. | |
| 2021/0208682 A1* | 7/2021 | Knoppert | G06F 3/0202 |
| 2022/0122788 A1 | 4/2022 | Lai et al. | |

\* cited by examiner

KEYBOARD MEMBRANE AND KEYBOARD

FIELD OF THE INVENTION

The invention relates to a thin sheet molded object, and more particularly to a key membrane, a keyboard membrane, and a keyboard with the key membrane and the keyboard membrane.

DESCRIPTION OF THE RELATED ART

Electronic products or machinery such as various remote controls, keyboards, or mechanical equipment have a large number of buttons or keys for transmitting signals. The buttons of the remote control and mechanical equipment are not waterproof and dustproof, the surfaces of the buttons are not wear-resistant, and the tactile impression is not good.

A flexible protective membrane is disposed on the keyboard of a notebook computer to protect the keys, and the user taps the keys through the protective membrane. The early protective membrane is flat, and the tactile impression of pressing the keys is not good.

It is known that a type of conventional membrane placed on top of a laptop is molded to match the concave-convex structure of the keys, and the feeling of use is better than that of a flat protective membrane. However, this type of membrane is made of materials such as silicone rubber, it is thick, such as at least 0.5 mm or more, the wear resistance is poor, the moldability is not good, it is easy to twist, the surface is easy to wear, get dirty and sticky, and the effect of use is not good. Moreover, characters are printed on the surface of the membrane, which is not environmentally friendly.

The conventional membrane has the following problems:

The conventional protective membrane or membrane only covers the keys, and cannot provide waterproof and dustproof functions for the keyboards of electronic products.

The conventional membrane is thick, the ductility is poor, the molding effect is not good, the intersection angles or bending positions of the concave-convex parts of the membrane cannot be well shaped, and defects such as cracking and poor molding are prone to occur.

Due to the membrane being thick, the adjacent concave-convex parts are pulled against one another, and the user has to tap the keyboard hard, resulting in poor handfeel when tapping the keyboard. Moreover, due to the keyboard membrane being thick, the stroke of keystrokes is not accurate. After the keyboard is used for a period of time, the problem of invalid keystrokes is prone to occur, and the keys cannot be pressed effectively.

The surface layer of the conventional membrane is not wear-resistant, which affects the effect of use, and the surface of the keyboard membrane is unstable, easy for dirt to stick on the surface, or easy to get sticky. For example, the physical properties of the plastic layer will change due to oxidation and degradation, resulting in poor tactile impression of the keyboard membrane.

SUMMARY OF THE INVENTION

An object of the invention is to provide a keyboard membrane and a keyboard, so that the keyboard using the keyboard membrane has effects of waterproof and dustproof.

Another object of the invention is to provide a waterproof keyboard membrane with a concave-convex structure, the keyboard membrane is thin, soft, wear-resistant, excellent in physical properties, has excellent ductility and elasticity, and is conducive to being molded and shaped in a mold.

The keyboard membrane provided by the invention is a thin sheet molded object thermoformed by a thermoplastic wear-resistant molding membrane, comprising a plurality of concave-convex parts;

the concave-convex part comprises a plurality of upwardly protruding pressing parts, each of the pressing parts has a top wall and a peripheral wall extending downward from a periphery of the top wall; the keyboard membrane is used for disposing on a key module with keys; each of the pressing parts is used for connecting with one of the keys of the key module;

a periphery of the keyboard membrane further has a peripheral edge extending outward from the pressing part, and the peripheral edge is used for wrapping the key module.

The keyboard provided by the invention has a keyboard module and the keyboard membrane, the keyboard module has a plurality of keys; each of the pressing parts of the keyboard membrane is connected with one of the keys of the key module; and the peripheral edge of the keyboard membrane wraps a periphery and a bottom surface of the key module.

Thereby, the keyboard membrane is capable of wrapping the key module, the keyboard membrane and the key module form a waterproof and dustproof keyboard as a whole, making a key module of electronic products or mechanical equipment waterproof and dustproof, even if a keyboard or an electronic product is put into water, the keyboard is still waterproof and dustproof, preventing dirt and moisture from entering the keyboard.

Preferably, the keyboard membrane comprises: a polycarbonate polyurethane (PU) layer, being polycarbonate polyurethane; a thermoplastic polyurethane (PU) layer, with ductility and elasticity, disposed on one surface of the polycarbonate PU layer; the polycarbonate PU layer is a surface layer of the molded object, the thermoplastic PU layer is an inner layer of the molded object. In this way, the keyboard membrane is light, thin, soft, and has good elasticity, ductility and wear resistance.

Preferably, the keyboard membrane further comprises at least one character disposed on the top wall of each of the pressing parts, and the character is formed by removing a material of the polycarbonate PU layer, so that the top wall forms a hollow part.

Preferably, the thermoplastic PU layer is manufactured to have a color, and the thermoplastic PU layer is exposed in the hollow part.

Preferably, an intermediate PU layer can be further provided between the polycarbonate PU layer and the thermoplastic PU layer; a depth of the hollow part reaches the polycarbonate PU layer or the intermediate PU layer.

Preferably, the intermediate PU layer is transparent, translucent or opaque, and the intermediate PU layer can be polycarbonate polyurethane or a thermoplastic PU layer.

Preferably, the intermediate PU layer has transmittancy; the key module has a backlight module, a light of the backlight module is capable of penetrating the intermediate PU layer and passing through the hollow part.

Preferably, the concave-convex part comprises a touch area formed to be used as a touch panel of an electronic device or a mechanical equipment.

Preferably, when the thermoplastic PU layer is stretched no more than 20% of stretching amount, after being stretched repeatedly for 300,000 times, an elastic recovery rate thereof is no less than 98%; a thickness of the keyboard membrane is between 0.03 mm and 0.1 mm.

BRIEF DESCRIPTION OF DRAWINGS

The objects, features, and achieved efficacies of the invention can be understood from the description and drawings of the following preferred embodiments, in which.

DETAILED DESCRIPTION OF THE INVENTION

Figure 1:
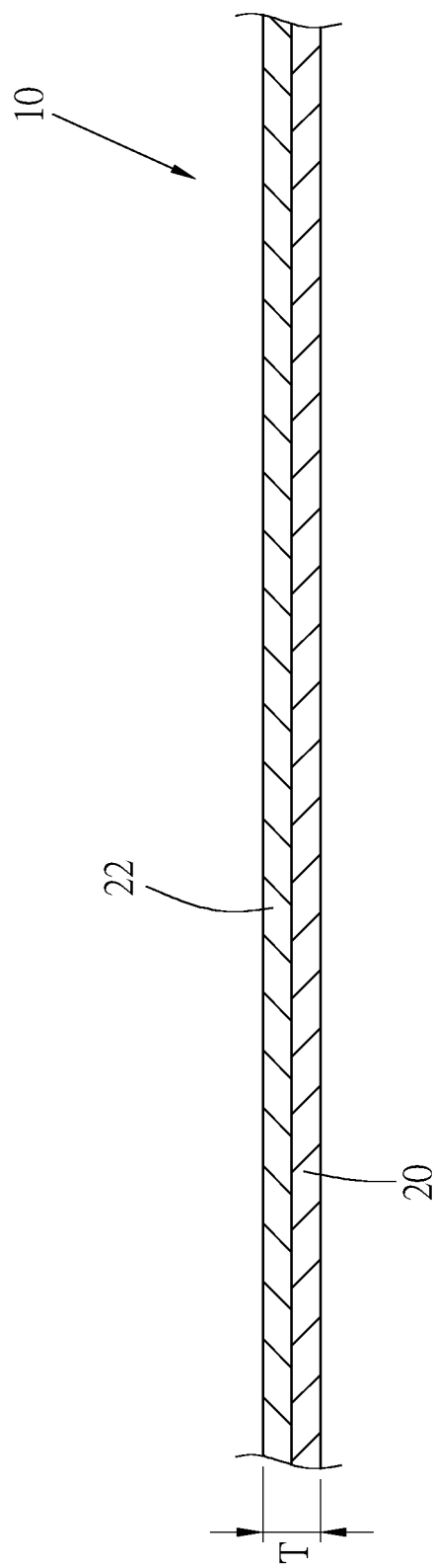
FIG. 1 is a cross-sectional view of a thermoplastic wear-resistant molding membrane used in the invention.

The invention provides a keyboard membrane 30 and a keyboard 50 with the keyboard membrane 30, so that the keyboard 50 is waterproof. FIG. 3 to FIG. 6 show several preferred embodiments of the keyboard membrane 30 (30a~30d) of the invention, and the keyboard membrane 30 is made with a thermoplastic wear-resistant molding membrane 10 (hereinafter referred to as the molding membrane) of FIG. 1.

The molding membrane 10 comprises: a polycarbonate polyurethane layer (or polycarbonate PU layer) 20 and a thermoplastic polyurethane (polyurethane elastomer) layer (or thermoplastic PU layer) 22, and the two PU layers 20, 22 are combined. The molding membrane 10 can be molded into a thin sheet molded object with a concave-convex structure, which can be used as the keyboard membrane 30 for various products such as calculators, computers, laptops, wired or wireless keyboards, remote controls, and automation equipment or mechanical equipment to become a touch-pressing molded object.

A material of the polycarbonate PU layer 20 is polycarbonate polyurethane, a thermoplastic polyurethane elastomer formed by polymerization of polycarbonate compounds, such as polycarbonate diols (PCDL), which has excellent physical properties and mechanical properties such as hydrolysis resistance, heat resistance, wear resistance, oxidative degradation resistance and weather resistance to be capable of withstanding a temperature of −40° C.~80° C.

The thermoplastic PU layer 22 is a polyester type (Ester), polyether type (Ether) or polycarbonate type thermoplastic polyurethane, which is a polymer elastomer with excellent ductility and elasticity. Preferably, a ductility of the thermoplastic PU layer 22 of this embodiment still has an elastic recovery rate of no less than 98% after being stretched for 300,000 times at a stretching amount of no more than 20%. Preferably, a stretching recovery rate is not less than 99%, and has excellent recovery after stretching. The thermoplastic PU layer 22 is softer, more stretchable and elastic than the polycarbonate PU layer 20, and is suitable for molding and shaping.

Figure 2:
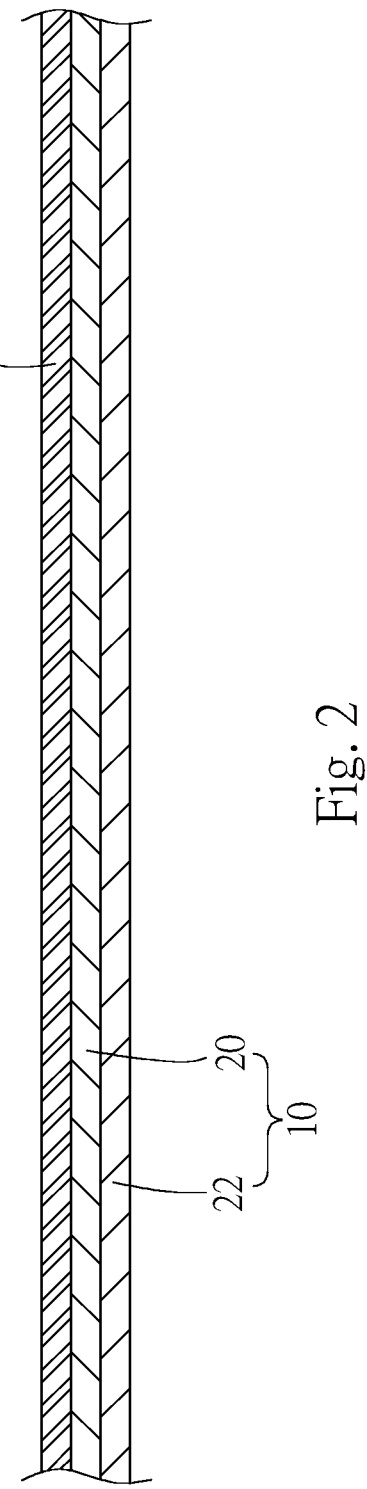
FIG. 2 is a cross-sectional view of a molded structure of the molding membrane of FIG. 1.

Please refer to FIG. 2, the polycarbonate PU layer 20 and the thermoplastic PU layer 22 are coated on a release surface of a release layer 24 with a liquid PU material, and are formed by drying. The release layer 24 can be a release paper or release membrane. The polycarbonate PU layer 20 is disposed on the release surface of the release layer 24, and the thermoplastic PU layer 22 is disposed on a surface of the polycarbonate PU layer 20. Through a coating method of the applicant, problems of producing fish eyes (refer to incompletely mixed and refined crystals of PU particles in a manufacturing process of extrusion or injection of PU membrane, commonly known as crystal dots) and producing bubbles by the conventional coating method can be avoided in the molding membrane 10 to be capable of producing the thin molding membrane 10 with small tolerance and uniform texture precisely, so that a thickness T is less than 0.1 mm, which is between 0.03 mm and 0.1 mm, preferably, a thickness of the molding membrane 10 is 0.03 mm~0.07 mm, most preferably, the thickness T ranges from 0.05 mm~0.06 mm, and a hardness thereof is below 85 D (inclusive) of Rockwell hardness, and has flexibility. The molding membrane 10 is light, thin, soft, easy to shape, and has excellent elasticity, ductility and wear resistance. In this embodiment, a thickness of the polycarbonate PU layer 20 is 0.04 mm or 0.05 mm, and a thickness of the thermoplastic PU layer 22 is 0.02 mm or 0.03 mm. The release surface of the release layer 24 can be patterned or matte treated, so that an outer surface of the polycarbonate PU layer 20 can be patterned or matted.

When the molding membrane 10 is to be thermoplastically molded, the molding membrane 10 can be molded without peeling off the release layer 24 or in a state where the release layer 24 is peeled off. If molding is carried out in a state where the release layer 24 is not peeled off, the release layer 24 is torn off after the molding membrane 10 is finished with molding.

With a moldability of the thermoplastic PU layer 22, the molding membrane 10 can be molded into thin sheet molded objects of various shapes by a mold, to be used as touchable molded objects for users to press and touch, for example, being used as touchable outer layers of various electronic devices, such as but not limited to, keyboard membranes of remote controls, notebook computers, mobile phones, monitors, etc. The four types of keyboard membranes 30 (30a to 30d) shown in FIGS. 3 to 6 can be used in electronic devices or machines with physical keys or buttons, for example, for using in keys or buttons of notebook computers, keyboards, remote controls, and mechanical operation panels.

The molding membrane 10 is thermoplastically molded into the keyboard membranes 30 of various dimensions and sizes in a mold at a temperature of 100~250° C., for example, molding is performed in the mold by suction. Each of the keyboard membranes 30 can be molded with a plurality of concave-convex parts as required, as shown in FIG. 3 to FIG. 8. The concave-convex part comprises a plurality of upwardly protruding pressing parts 32, corresponding to a plurality of keys 42 of a key module 40, and each of the keys 42 has a keycap 44 and a key foot 45. Please refer to FIG. 4, the concave-convex part further comprises a larger concave touch area 33, which corresponds to a touch pad of an electronic device or a notebook computer. The molding membrane 10 is thin enough to enable the keyboard membranes 30 to form the touch area 33.

Figure 3:
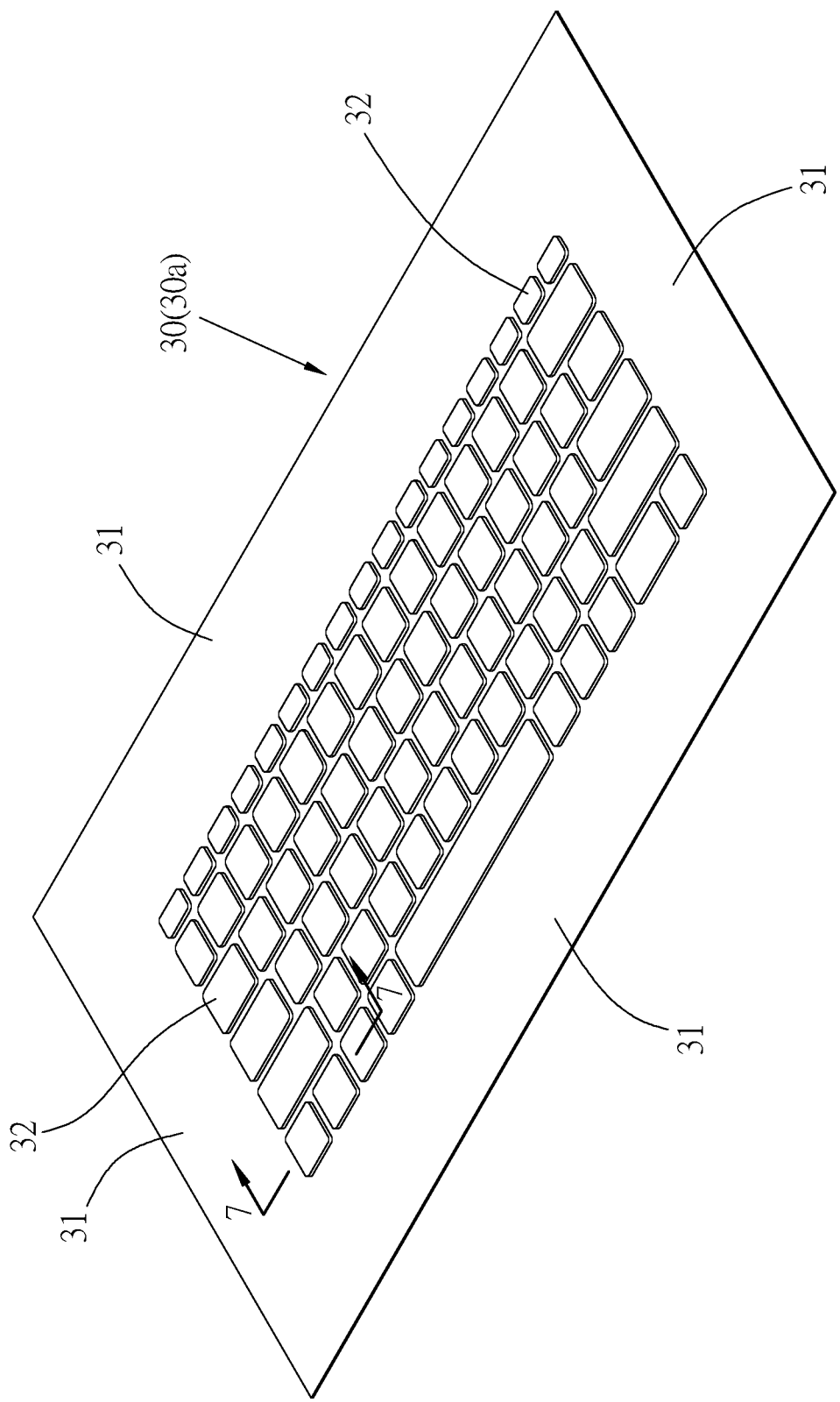
FIGS. 3 to 6 are perspective views of four keyboard membranes molded from the molding membrane of FIG. 1, wherein the keyboard membranes of FIGS. 5 and 6 show that characters are made.
Figure 3A:
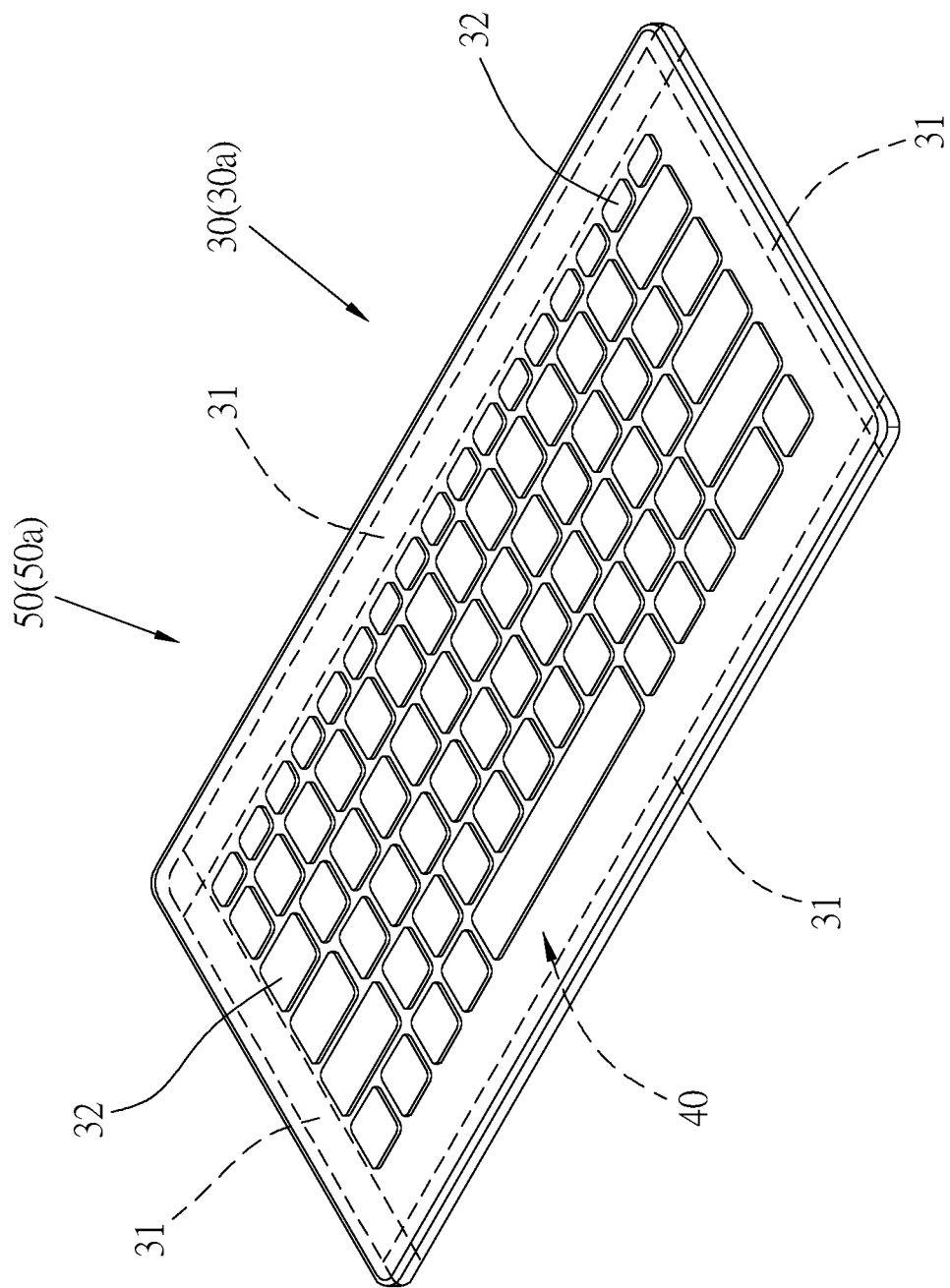
FIG. 3A is a perspective view of a peripheral edge of the keyboard membrane of FIG. 3 wrapping a keyboard module to form a keyboard.
Figure 4:
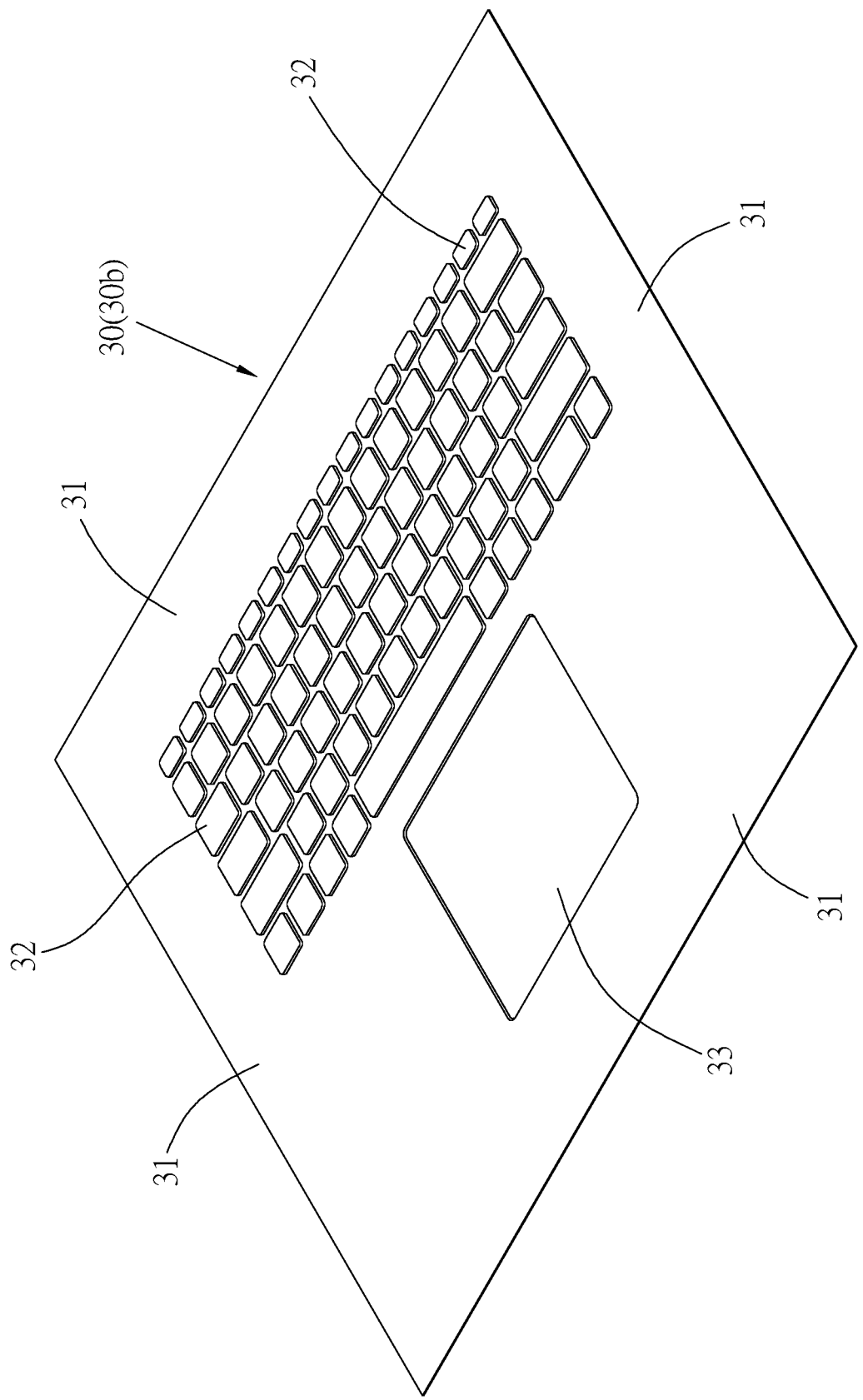
Figure 4A:
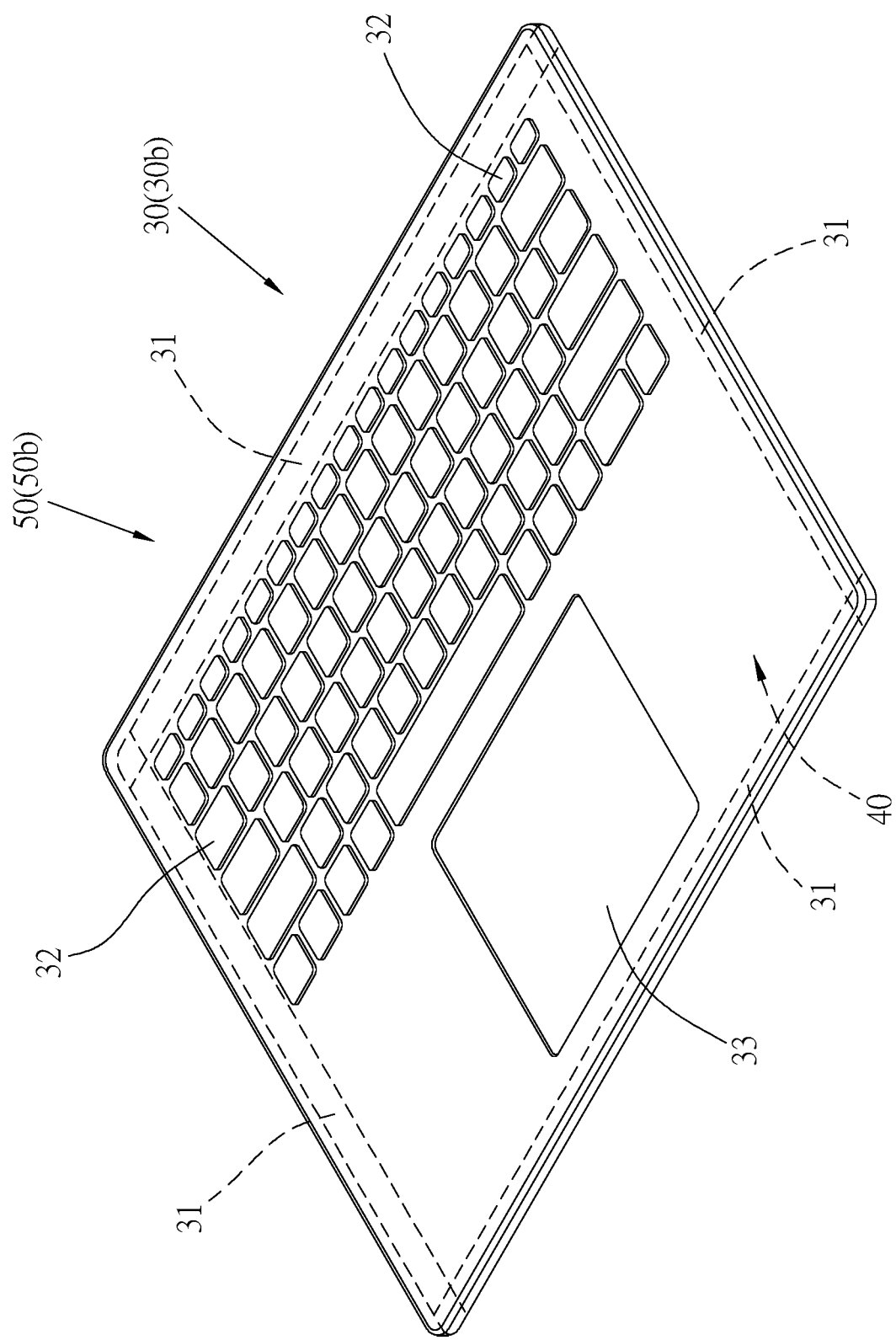
FIG. 4A is a perspective view of the peripheral edge of the keyboard membrane of FIG. 4 wrapping the keyboard module to form the keyboard.

Please refer to FIG. 3 to FIG. 6, front, rear, left and right peripheries of the keyboard membrane 30 of the invention are further provided with a peripheral edge 31 extending outward from the pressing parts 32, and the peripheral edge 31 can be used to wrap other parts other than the keys 42 of the key module 40, as shown in FIGS. 3A and 4A. The peripheral edge 31 of the keyboard membrane 30 wraps a periphery of the key module 40 and wraps a bottom surface of the key module 40 downwards, so that parts other than the keys 42 can also be waterproof and dustproof. After the keyboard membrane 30 wraps the key module 40, the waterproof and dustproof keyboard 50 (50a, 50b) is formed as a whole. The polycarbonate PU layer 20 is a surface layer of the keyboard membrane 30, and the thermoplastic PU layer 22 is an inner layer of the keyboard membrane 30. When a user presses the keys 42, the polycarbonate PU layer 20 is contacted.

Figure 5:
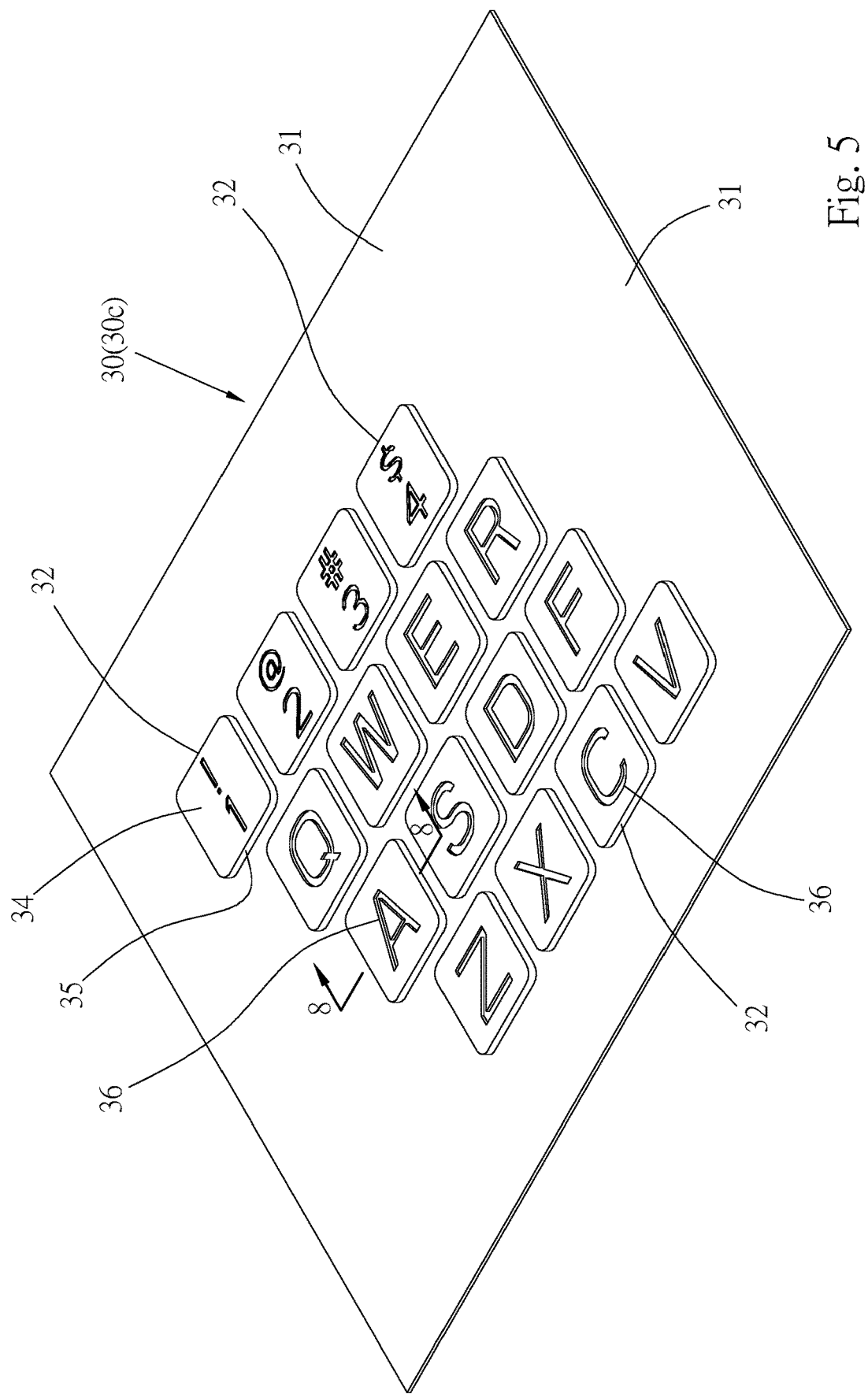
Figure 6:
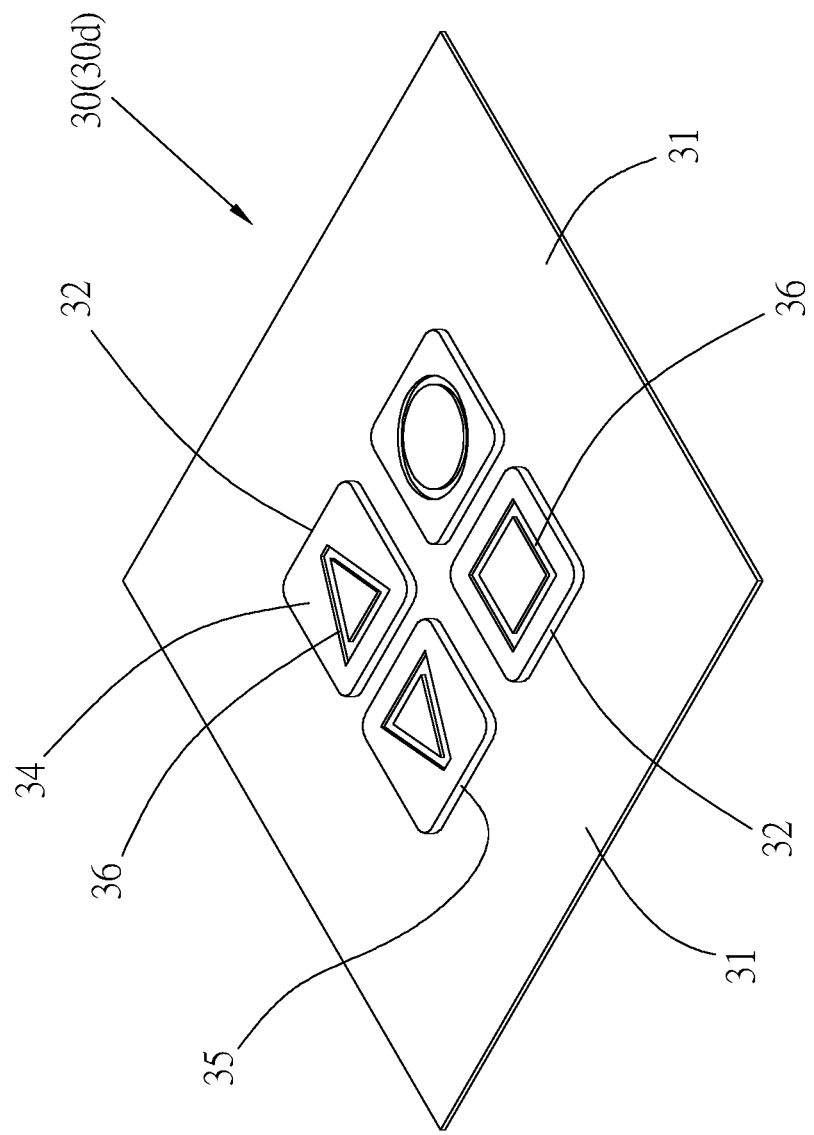
Figure 7:
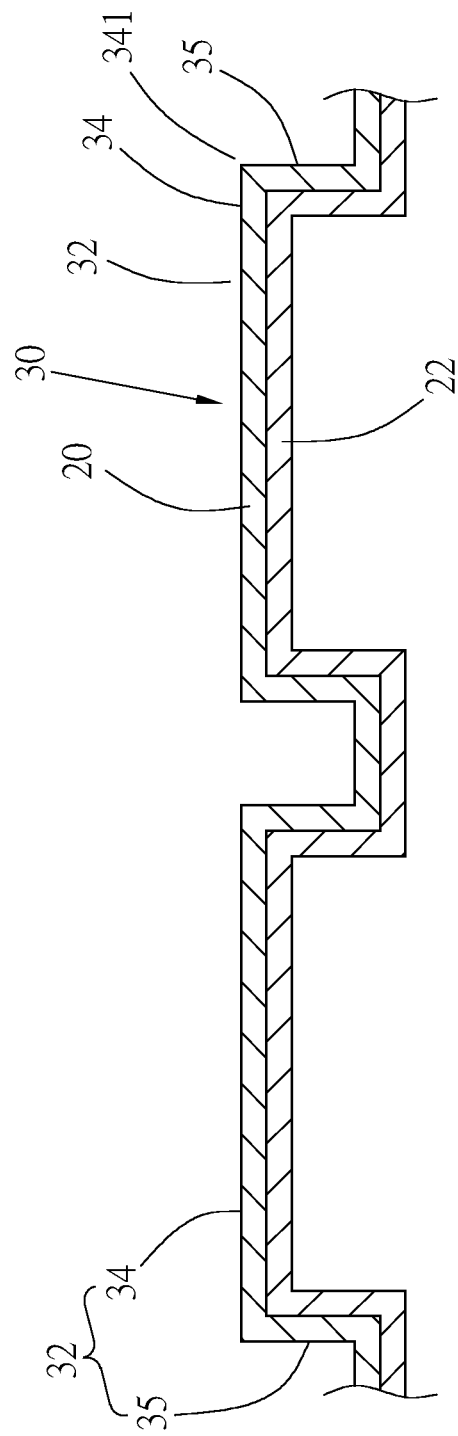
FIG. 7 is a cross-sectional view of section line 7-7 in FIG. 3.
Figure 8:
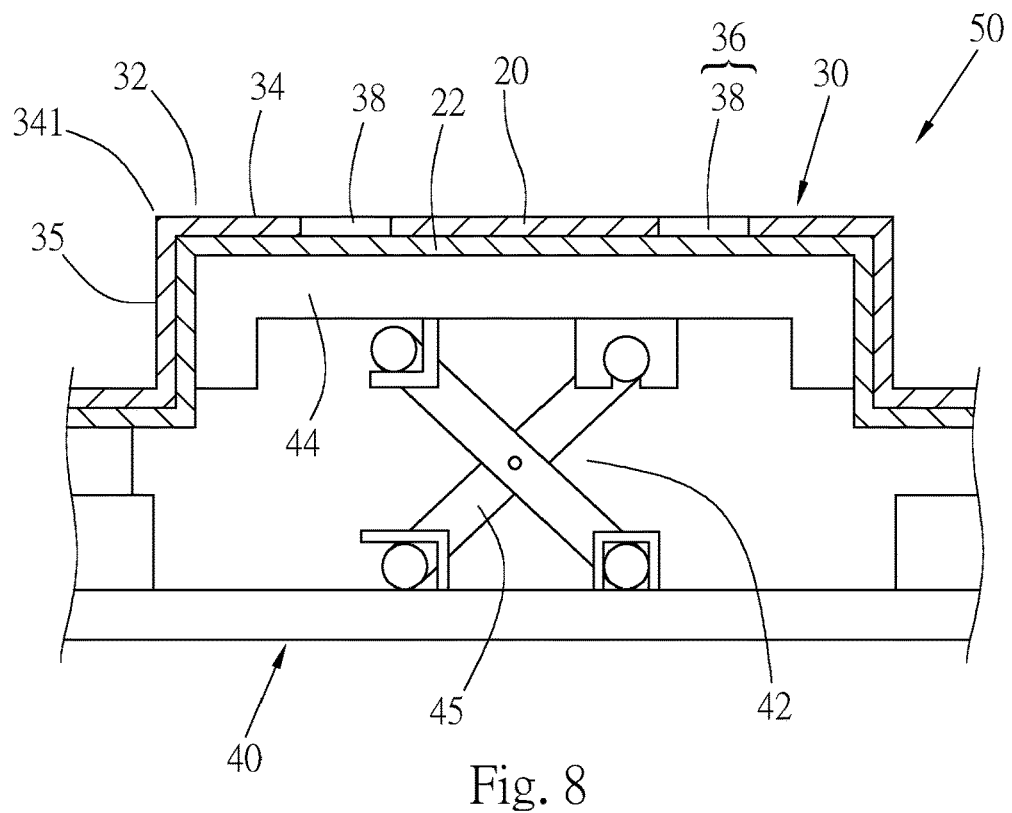
FIG. 8 is a partial cross-sectional view of the keyboard of a preferred embodiment of the invention, and this cross-sectional view is at a position of section line 8-8 in FIG. 5.
Figure 10:
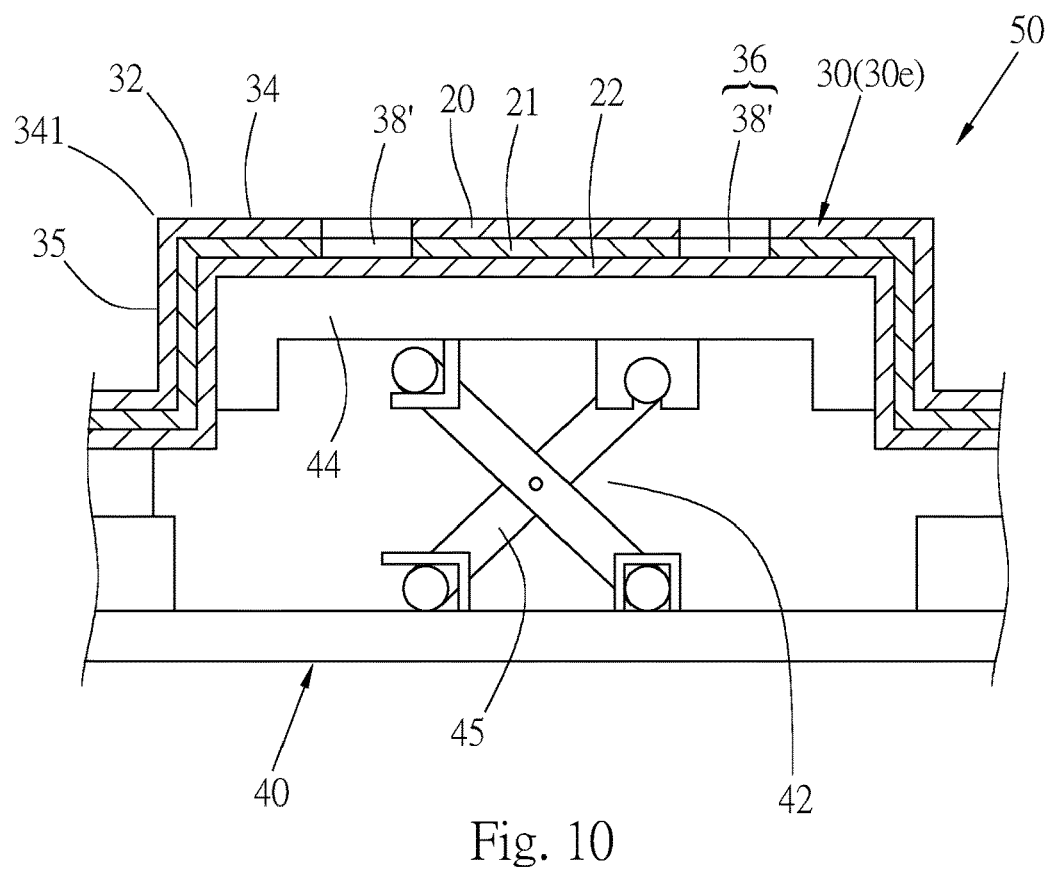
FIG. 10 is a partial cross-sectional view of the keyboard of another preferred embodiment of the invention.

Each of the pressing parts 32 has a rectangular or other geometrically shaped top wall 34 and a peripheral wall 35 extending downward from a periphery of the top wall 34. As shown in FIGS. 7, 8, and 10, the top wall 34 is located perpendicular to the peripheral wall 35 and defines an intersection angle 341 and has a flat edge located between the top wall 34 and the peripheral wall 35. As shown in FIG. 5 and FIG. 8, one character 36 or a plurality of characters 36 is/are engraved on the top wall 34 of each of the pressing parts 32 by laser, and the different characters 36 are engraved on the different pressing parts 32. The characters 36 engraved by laser are formed by removing a material of the polycarbonate PU layer 20, and a depth of engraving reaches the thermoplastic PU layer 22, so each of the characters 36 forms a hollow part 38 penetrating the polycarbonate PU layer 20 on the top wall 34, as shown in FIG. 8, and the thermoplastic PU layer 22 is exposed at the hollow part 38.

The polycarbonate PU layer 20 and the thermoplastic PU layer 22 have different colors, for example, the polycarbonate PU layer 20 has a dark color, while the thermoplastic PU layer 22 has a light color, and vice versa. Therefore, a color of the character 36 is a color of the thermoplastic PU layer 22, which can be clearly displayed on the pressing part 32. The thermoplastic PU layer 22 can be a color layer, which can be formed by mixing colorants or pigments to display various colors and become a color of the character 36.

The keyboard membrane 30 after laser engraving, as shown in FIG. 8, is installed on the key module 40 of an electronic device or a mechanical equipment, and the peripheral edge 31 of the keyboard membrane 30 wraps the key module 40. Each of the pressing parts 32 corresponds to one of the keys 42, and an inner surface of the pressing part 32 is bonded to the keycap 44 of the key 42 by a hot melt adhesive or a glue. For example, the hot melt adhesive is pasted on a top surface of the keycap 44 to bond the pressing part 32 to the keycap 44, and each of the keys 42 can be pressed from each of the pressing parts 32. The polycarbonate PU layer 20 is a surface layer of the keyboard membrane 30, which makes a surface of the keyboard membrane 30 wear-resistant, free from hand marks, difficult for dirt to stick on the keyboard membrane 30, and not sticky. Preferably, the pressing part 32 is bonded to the keycap 44 only by an inner surface of the top wall 34, and the peripheral wall 35 of the pressing part 32 is not in contact with the hot melt adhesive, so that physical properties of the peripheral wall 35 will not be affected by the hot melt adhesive. The key module 40 described above is not a main object of the invention, so it will not be described in detail.

The thermoplastic PU layer 22 can not only be made to have different colors, but also can be made transparent or translucent to have transmittancy, so that the key module 40 can use backlight technology to enable LED light to penetrate through the hollow part 38 to make the character 36 glow.

Figure 9:
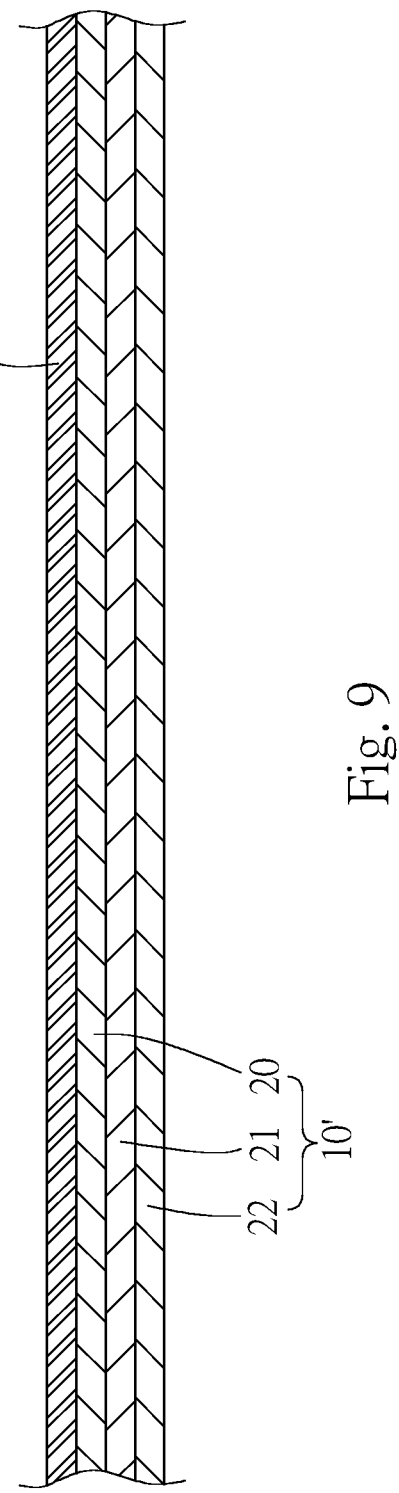
FIG. 9 is a cross-sectional view of another thermoplastic wear-resistant molding membrane used in the invention.

A thermoplastic wear-resistant molding membrane 10' of FIG. 9 can be thermoplastically made into the keyboard membrane 30 (30e) of FIG. 10 in a mold, the molding membrane 10' has the polycarbonate PU layer 20, the thermoplastic PU layer 22, and further comprises: an intermediate polyurethane layer (or intermediate PU layer) 21. The polycarbonate PU layer 20 and the thermoplastic PU layer 22 are the same as those of the first preferred embodiment, which can be understood from that embodiment.

The intermediate PU layer 21 in this embodiment is also a polycarbonate PU, which is the same as the polycarbonate PU layer 20, but not limited thereto, and other types of thermoplastic PU can be used.

The polycarbonate PU layer 20, the intermediate PU layer 21 and the thermoplastic PU layer 22 are sequentially coated with a liquid PU material on the release layer 24 and formed by drying. The polycarbonate PU layer 20 is disposed on the release surface of the release layer 24, the intermediate PU layer 21 is disposed on a surface of the polycarbonate PU layer 20, and the thermoplastic PU layer 22 is disposed on a surface of the intermediate PU layer 21. The applicant is capable of precisely manufacturing the thin molding membrane 10' with small tolerance and uniformity by a coating method, and there are no fish eyes (crystal dots) and air bubbles inside the molding membrane 10'. The thickness T of the molding membrane 10' ranges from 0.04 mm to 0.1 mm, preferably mm to 0.09 mm. The thickness T formed by the three PU layers 20, 21 and 22 of this embodiment is preferably below 0.04 mm~0.08 mm (inclusive), most preferably, the thickness T is between 0.05 mm and 0.07 mm, and a hardness of the molding membrane is below 85 D of Rockwell hardness. The molding membrane 10' is light, soft, and has excellent elasticity, ductility and wear resistance. In this embodiment, the polycarbonate PU layer 20 has a thickness of 0.03 mm, the intermediate PU layer 21 has a thickness of mm, and the thermoplastic PU layer 22 has a thickness of 0.02 mm. The polycarbonate PU layer 20 and the thermoplastic PU layer 22 are made to have contrasting colors of dark and light colors; and the intermediate PU layer 21 is transparent or translucent.

When the molding membrane 10' is thermoplastically molded, it can be molded under a state of peeling off or not peeling off the release layer 24 in order to be molded into the keyboard membrane 30 with desired shape and contour. A thickness of the keyboard membrane 30 is T, and a hardness thereof is below 85 D of Rockwell hardness.

FIG. 10 shows that the molding membrane 10' of FIG. 9 is thermoplastically molded into the keyboard membrane 30 (30e) in a mold, and combined with the key module 40 to form the waterproof and dustproof keyboard 50, the keyboard membrane has the concave-convex parts, comprising the upwardly protruding pressing parts 32, and an inner surface of each of the pressing parts 32 is bonded with the keycap 44 of the key 42 of the key module 40. The polycarbonate PU layer 20 is a surface layer of the keyboard membrane 30 (30e), the thermoplastic PU layer 22 is an inner layer of the keyboard membrane 30 (30e), and the intermediate PU layer 21 is located between the polycarbonate PU layer 20 and the thermoplastic PU layer 22. The polycarbonate PU layer is touched by the user when operating keys or buttons of an electronic device. The intermediate PU layer 21 is made into a transparent or translucent layer to enable light to penetrate, or the intermediate PU layer 21 can be made into an opaque layer.

Each of the pressing parts 32 has the top wall 34 and the upright peripheral wall the character 36 or the characters 36 is/are engraved on the top wall 34 by laser, so that the top wall 34 forms a hollow part 38' that penetrates the polycarbonate PU layer 20. Laser engraving is used to remove a material of the polycarbonate PU layer 20, a depth of laser engraving (that is, a depth of the hollow part 38') is capable of reaching the polycarbonate PU layer 20 or even reaching the intermediate PU layer 21. The intermediate PU layer 21 is capable of protecting the thermoplastic PU layer 22 during laser engraving. If the intermediate PU layer 21 is transparent or translucent, even if a material of the intermediate PU layer 21 is not removed or only partially removed, a color of the thermoplastic PU layer 22 can still be exposed in the hollow part 38', making the characters 36 of the pressing parts 32 have colors. When a backlight module of the key module 40 emits light, the light is capable of penetrating the intermediate PU layer 21 and passing through the hollow part 38', so that the characters 36 of the pressing parts 32 are capable of emitting light.

The keyboard membrane 30 of the invention has the following efficacies.

The keyboard membrane 30 is molded and shaped in one piece, which is dustproof and waterproof. The keyboard membrane 30 wraps the keys 42 and wraps a periphery and a bottom surface of the key module 40 by the peripheral edge 31, so that the keyboard membrane 30 and the key module 40 form the waterproof and dustproof keyboard 50, preventing dirt, liquid, and moisture from entering the keyboard 50. Thus a keyboard of an electronic device or an independent keyboard, such as notebook computers and keyboards used by special forces for military purposes, is still waterproof even when wading in water in order to maintain usability.

A surface layer of the keyboard membrane 30 is formed by the polycarbonate PU layer 20, which has a property of wear resistance and can be used for a long period of time without wear. The polycarbonate PU layer 20 is subjected to a wear resistance test with a soft rubber weighing 350 grams, and is capable of withstanding more than 15,000 times of friction without breaking.

Physical and chemical properties of the polycarbonate PU layer 20 are stable, a surface of the keyboard membrane 30 is stable, does not change, is not easy to get dirty, and is not sticky, and a tactile impression of fingers on surface layers of the pressing parts 32 (that is, the polycarbonate PU layer 20) is fresh and clean and not sticky. Moreover, the polycarbonate PU layer 20 is weather-resistant, and a usability thereof will not be affected in extreme weather environments.

The keyboard membrane 30 is extremely thin (not more than 0.1 mm), soft and has excellent ductility, and can be precisely thermoplastically molded, and an intersection angle 341 or a bending position between a junction of the top wall 34 and the peripheral wall 35 of the pressing part 32 can be precisely, completely and beautifully molded and shaped. A ductility of the thermoplastic PU layer 22 is excellent, and can be stretched to more than twice a length, so the molding membrane 10 is capable of meeting particularly large demands for ductility at angles of the molded object, and the intersection angle 341 or a bending position of the keyboard membrane 30 can be molded and shaped smoothly without breaking.

The keyboard membrane 30 of the invention is formed of at least two PU layers of two different materials, is thin and soft, and the thermoplastic PU layer 22 provides excellent elasticity. The shaped keyboard membrane 30 is also thin and has excellent elasticity. When the pressing part 32 is pressed, the peripheral wall 35 can be easily deformed, flexed and elastically recovered. A keystroke (press-recover) of tapping the pressing part 21 and the key 42 is clear, providing excellent tactile impression and handfeel of tapping. Since the keyboard membrane 30 is thin and soft, the user only needs to press the key 42 effortlessly. The keyboard membrane 30 has an excellent stretching recovery rate, so that the pressing part 32 has an excellent recovery after being tapped. According to the applicant's experiment, the pressing part 32 has an elastic recovery rate of 99% after being tapped tens of thousands of times.

Furthermore, the keyboard membrane 30 is thin, soft and has excellent elasticity, and the adjacent pressing parts 32 will not pull against one another, so the user can easily tap the keyboard 50.

A keystroke of tapping the pressing part 21 of the keyboard membrane 30 is stable and reliable, even after a long period of use, and invalid keystroke will not occur.

The molding membrane 10 has no fish eyes and air bubbles, and there will be no crystal dots and air holes in the molded keyboard membrane 30. When a light of a backlight module passes through the characters 36, the light will not be refracted or scattered, and will not cause consumers to consider the keyboard membrane to be a defective product.

The molding membrane 10 is thin and uniform, and a manufacturing tolerance thereof is small, a tolerance of thickness can be 0.005 mm~0.01 mm, such as 0.025 mm, so that the keyboard membrane 30 of the invention with a thickness of less than 0.1 mm can be precisely engraved by laser.

The keyboard membrane 30 is engraved by laser from the front polycarbonate PU layer 20 toward an inner direction, and laser engraving operation is simple and easy to implement.

The thermoplastic PU layer 22 is used as a color layer, which can be toned into different colors to make the characters 36 have different colors. The thermoplastic PU layer 22 of this embodiment is made white with white pigments, such as titanium white or calcium carbonate, while the polycarbonate PU layer 20 is made black, so the two PU layers 20, 22 form contrasting colors of light color and dark color, making the characters 36 distinct. In addition, the molding membrane 10 can be added with graphene to make the keyboard membrane 30 conductive electrically.

Although the invention has been disclosed as above with the embodiments, it is not intended to limit the invention. A person having ordinary skill in the art to which the invention pertains can make various changes and modifications without departing from the spirit and scope of the invention. Therefore, scope of protection of the invention shall be subject to what is defined in the pending claims.

What is claimed is:

1. A keyboard membrane, being a thin sheet molded object thermoformed by a thermoplastic wear-resistant molding membrane, comprising a plurality of concave-convex parts;

the concave-convex part comprising a plurality of upwardly protruding pressing parts, each of the pressing parts having a top wall and a peripheral wall extending downward from a periphery of the top wall; the keyboard membrane being used for disposing on a key module; each of the pressing parts being used for corresponding to a key of the key module;

a periphery of the keyboard membrane further having a peripheral edge extending outward from the pressing part, and the peripheral edge being used for wrapping the key module; and a polycarbonate polyurethane (PU) layer, being polycarbonate polyurethane; a thermoplastic polyurethane (PU) layer, with ductility and elasticity, disposed on one surface of the polycarbonate PU layer; the polycarbonate PU layer being a surface layer of the molded object, the thermoplastic PU layer being an inner layer of the molded object; and a thickness of the keyboard membrane is equal to or greater than 0.03 mm and less than 0.1 mm.

2. The keyboard membrane as claimed in claim 1, further comprising hollow parts being located in and extending through the polycarbonate PU layer and defining characters located on the top wall of at least some of the pressing parts, the characters being formed by removing a material of the polycarbonate PU layer.

3. The keyboard membrane as claimed in claim 2, the polycarbonate PU layer and the thermoplastic PU layer have different colors, and the thermoplastic PU layer is exposed through the hollow parts.

4. The keyboard membrane as claimed in claim 1, further comprising an intermediate PU layer disposed between the polycarbonate PU layer and the thermoplastic PU layer.

5. The keyboard membrane as claimed in claim 2, further comprising an intermediate PU layer disposed between the polycarbonate PU layer and the thermoplastic PU layer; a depth of the hollow part extending through the polycarbonate PU layer or the polycarbonate PU layer and the intermediate PU layer.

6. The keyboard membrane as claimed in claim 5, the polycarbonate PU layer and the thermoplastic PU layer have different colors, and the thermoplastic PU layer is exposed through the hollow parts.

7. The keyboard membrane as claimed in claim 5, wherein the intermediate PU layer is transparent, translucent or opaque.

8. The keyboard membrane as claimed in claim 4, wherein the intermediate PU layer is polycarbonate polyurethane or thermoplastic polyurethane.

9. The keyboard membrane as claimed in claim 5, wherein the intermediate PU layer has transmittancy; the key module has a backlight module, a light of the backlight module is capable of penetrating the intermediate PU layer and passing through the hollow part.

10. The keyboard membrane as claimed in claim 1, wherein the concave-convex part comprises a touch area formed to be used as a touch panel of an electronic device or a mechanical equipment.

11. The keyboard membrane as claimed in claim 1, wherein when the thermoplastic PU layer is stretched no more than 20% of stretching amount, after being stretched repeatedly for 300,000 times, an elastic recovery rate thereof is no less than 98%.

12. The keyboard membrane as claimed in claim 1, wherein the top wall of each of the pressing parts being located perpendicular to or approximately perpendicular to the peripheral wall thereof and defines an intersection angle.

13. The keyboard membrane as claimed in claim 12, wherein a flat edge is located between the top wall and the peripheral wall.

14. A keyboard comprising:
the keyboard membrane as claimed in claim 1; and
a key module having a plurality of keys, each of the keys having a keycap;
each of the pressing parts of the keyboard membrane being connected with the keycap of each of the keys;
the peripheral edge of the keyboard membrane wrapping a periphery of the key module.

15. The keyboard as claimed in claim 14, wherein the peripheral edge of the keyboard membrane wraps the periphery and a bottom surface of the key module.

16. The keyboard as claimed in claim 14, further comprising hollow parts being located in and extending through the polycarbonate PU layer and defining characters located on the top wall of at least some of the pressing parts, the characters being formed by removing a material of the polycarbonate PU layer.

17. The keyboard as claimed in claim 16, the polycarbonate PU layer and the thermoplastic PU layer have different colors, and the thermoplastic PU layer is exposed through the hollow parts.

18. The keyboard as claimed in claim 16, wherein the keyboard membrane comprises an intermediate PU layer disposed between the polycarbonate PU layer and the thermoplastic PU layer; a depth of the hollow part extending through the polycarbonate PU layer or the polycarbonate PU layer and the intermediate PU layer.

19. The keyboard as claimed in claim 18, wherein the intermediate PU layer has transmittancy; the key module has a backlight module, a light of the backlight module is capable of penetrating the intermediate PU layer and passing through the hollow part.

* * * * *